FIG. 1.

INVENTOR.
ROBERT J. SINGLETON
ATTYS.

FIG. 2.

Nov. 18, 1969   R. J. SINGLETON   3,479,645
ELECTRONIC MEASUREMENT SYSTEM FOR USE WITH CABLE TOWED BODIES
Filed March 31, 1966   9 Sheets-Sheet 3

FIG. 3.

INVENTOR.
ROBERT J. SINGLETON
BY
ATTYS.

INVENTOR.
ROBERT J. SINGLETON
BY
ATTYS.

United States Patent Office 3,479,645
Patented Nov. 18, 1969

3,479,645
ELECTRONIC MEASUREMENT SYSTEM FOR USE
WITH CABLE TOWED BODIES
Robert J. Singleton, Rockville, Md., assignor to the
United States of America as represented by the
Secretary of the Navy
Filed Mar. 31, 1966, Ser. No. 540,153
Int. Cl. H04g 9/02
U.S. Cl. 340—150                                    7 Claims

ABSTRACT OF THE DISCLOSURE

A data transmission system having a plurality of voltage controlled oscillators connected through respective calibrating circuits to drive respective transducers which feed their output signals into a mixer for transmitting the signal with or without the calibrating signal to a remote system for sorting and recording the data from the respective transducers. The calibrating circuit for each transducer including a plurality of resistors selectively connected by a rotary switch into the circuits between the respective oscillator and the transducers to present a constant load to the oscillator but a variable resistance between the output of the transducer and ground.

---

The invention described herein may be manufactured and used by or for the Government of the United States of America for governmental purposes without the payment of any royalties thereon or therefor.

The present invention relates to a telemetering system for towed bodies and more particularly to a telemetering system for towed bodies which are provided with a calibration network for the transducers mounted within the towed body.

The prior art contains telemetering systems for towed bodies which are carried above or below the surface of the water. These prior art systems generally operate satisfactory. However, the prior art systems have one or more of the following limitations; (1) they do not have means for calibrating the measuring transducers in situ; (2) they have a limited number of channels thereby limiting the number of sensors that can be carried by the towed body; and (3) the operational depth of the system is limited etc.

The present invention eliminates the aforementioned disabilities by providing a towed body containing a plurality of transducers, each one being equipped with a calibration network for in situ calibration of the transducers. Additionally the present invention utilizes a telemetering system which combines a plurality of information channels in the towed body for transmission over a single channel to the towing vehicle where the combined channels are separated again into their original information states. The towing vehicle is provided with recording means for providing a record of both the transmitted and the reconstructed information.

An object of the invention is to provide a towed body with in situ calibrated transducers.

A further object of the invention is to provide a telemetering system for a towed body having a plurality of transducers for continuously monitoring the condition of the towed body.

Another object of the invention is to provide a towed body with a data readout system located in the towing vehicle.

Still another object of the invention is to provide a towed body with a recording system which is located aboard a towing vehicle.

Other objects and many of the attendant advantages of this invention will be readily appreciated as the same becomes better understood by reference to the following detailed description when considered in connection with the accompanying drawings wherein:

Figure 1:
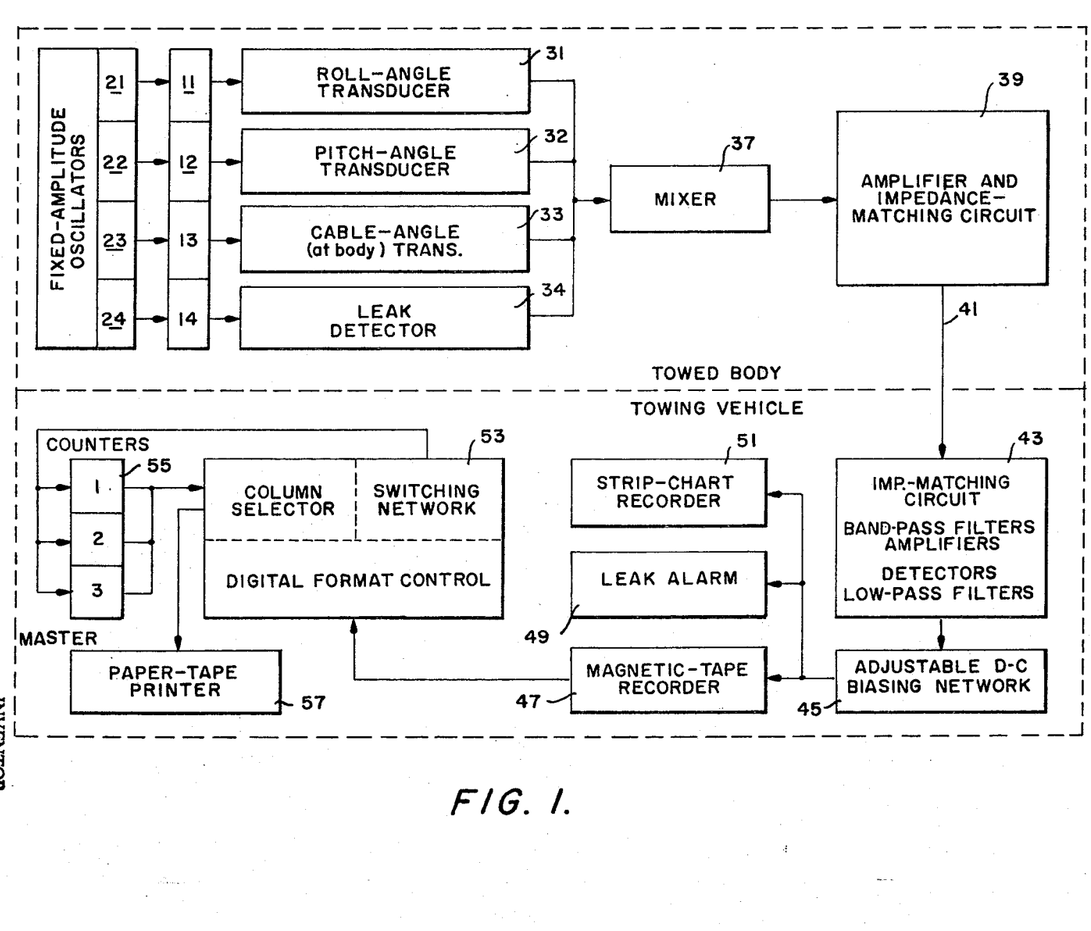
FIG. 1 is a simplified block diagram of the transducer sensing system for mounting in a towed vehicle and the associated telemetering system in accordance with the invention.

Referring to FIG. 1 there is provided a first oscillator 21 having a first constant output frequency which is fed through a first calibrating network 11 to the first transducer 31. The first transducer 31 is a roller angle transducer and is a viscous-damped pendulum known as an Edcliff Peidulum model 5–5–1. However, any type of sensors may be utilized and the cited transducers are only given as suitable examples. A second and different fixed frequency oscillator 22 is fed through a second calibration network 12 to a second transducer 32 which measures the pitch angle of the towed vehicle. The pitch angle transducer may be a viscous damped pendulum of the type known as an Edcliff Pendulum model 5–5–1 which has 2,000 ohm potentiometer output. A third fixed frequency oscillator 23 is fed through a third calibrating network 13 to a third transducer 33 for measuring the cable angle at the towed body. The third transducer may be also a viscous damped pendulum. A fourth fixed oscillator 24 is fed through a fourth calibrating network 19 to the fourth transducer 34 which is a leak detector. It is to be understood that the four transducers are merely given as examples and that other transducers units may be provided. The output of the transducers 31, 32, 33 and 34 are combined in a mixer 37 the output of which is fed through an amplifier and impedance network unit 39. The information developed at the towed body is then transmitted through a tow cable 41, containing electrical conductors for this purpose to an AM telemetering receiver 43 which is aboard the towing vehicle. The AM telemetering receive contains an impedance matching and band pass filter to separate out the signals which were combined aboard the towed vehicle. The signals are then detected in this unit and fed to the adjustable biasing networks 45 which feeds the magnetic tape recorder 47 and the ship chart recorder 51 and the leak detector 49. The magnetic tape recorder is provided with an output for feeding a digital format control unit which converts the analog signal to a digital signal. The switching network and column selector is manually set to determine the time interval of the count which is then recorded by a digital paper tape printer 57.

The operation of FIG. 1 and FIGS. 2 and 3 will be discussed in combination with the detailed block diagrams of FIG. 4a and 4b and circuit diagram 5a, 5b and 5c so that the invention may be better understood. The subcombination figures are presented to show the individual components which go to make the complete system so that the operation can be later better comprehended. It is to be understood that FIG. 1 illustrates the transducers which are mounted on the towed body and also the data processing equipment which is on the towing vehicle. Furthermore, it is to be understood that the lines interconnecting the body was merely schematic and that the magnetic tape recorders and the paper tape printer have a sufficient number of channels to accommodate all the transducers being used in the system.

Figure 2:
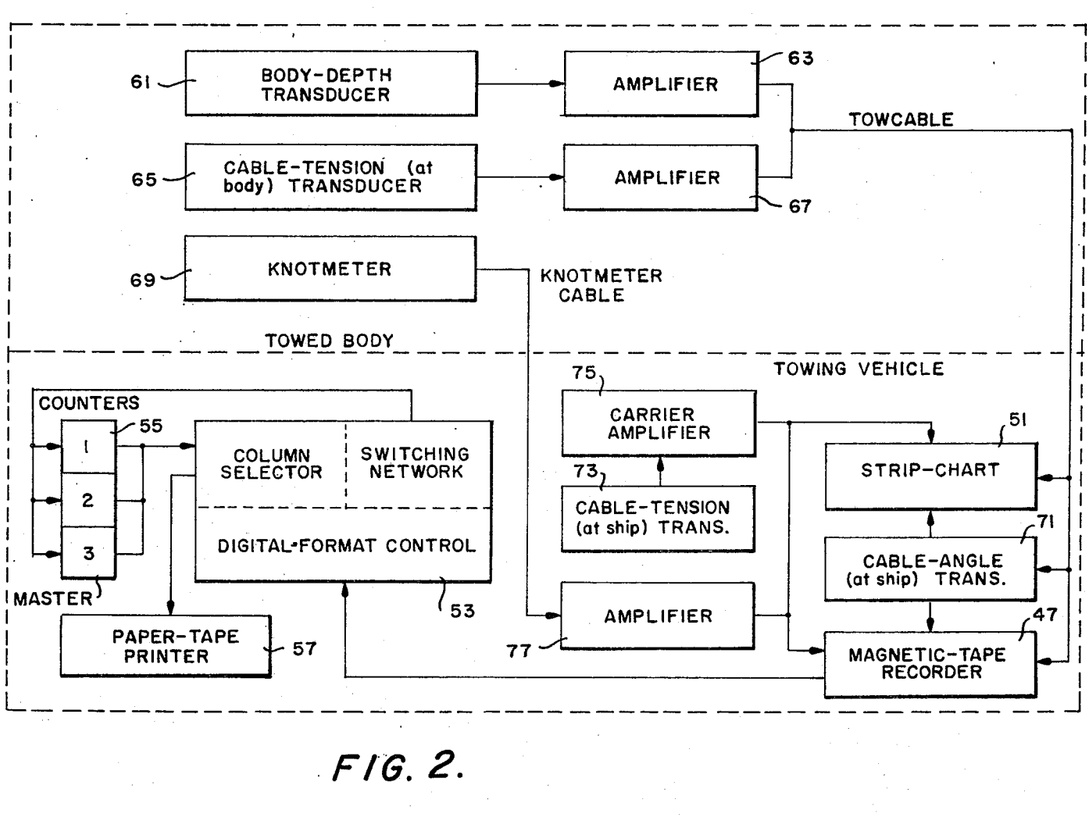
FIG. 2 is a simplified block diagram of a section which is directly coupled to the towing vehicle in accordance with the invention.

Referring to FIG. 2 there is presented the transducers which are directly connected by way of separate pairs of conductors from the towed body to the towing vehicle recording equipment. The first of these units is a body depth transducer 61 which is fed through an amplifier 63 to the towing vehicle instruments. The second transducer to be directly connected is the cable tension transducer 65 (at the body) which is connected to a second amplifier 67 in the towed body and thence to the towing vehicle. A knot meter 69 is directly connected to the amplifier 77 which is fed to one of the channels in magnetic tape recorder 47. The amplifiers 63 and 67 are connected to the strip chart recorder 51 and to respective channels on the magnetic tape recorder 47. A cable tension device 73 on the towing vehicle is connected through an amplifier 75 to the strip-chart recorder 51 and to the magnetic tape recorder 47. The cable angle transducer, which is mounted at the towing vehicle, is connected to the strip chart recorder 51 and also to the magnetic tape recorder 47. The output of the magnetic tape recorder is connected to the digital format control 53 which processes the analog output of the digital tape recorder in the same fashion as does the similar boxes in FIG. 1.

Figure 3:
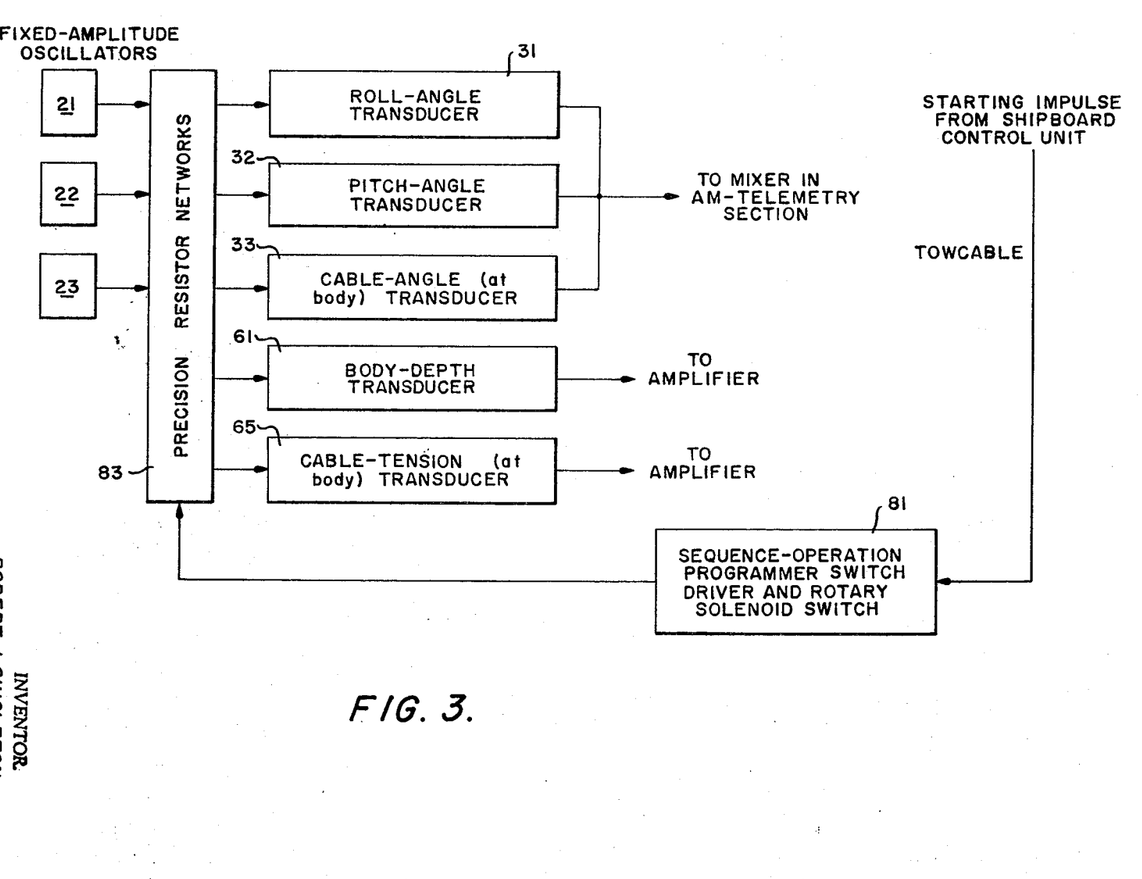
FIG. 3 is a block diagram of a remotely controlled electrical calibration network in accordance with the invention.

Referring to FIG. 3 there is illustrated the schematic block diagram of the calibration networks 83 individually shown as boxes 12, 13, 14, etc. in FIG. 1. The various transducers are switched by the sequence operation programer 81 which consists of a switch driver and rotary switch. This unit is provided with a separate control line from the towing vehicle through the towed cable. The remaining components retain the same numerical indicia and are the units heretofor described.

Figure 6:
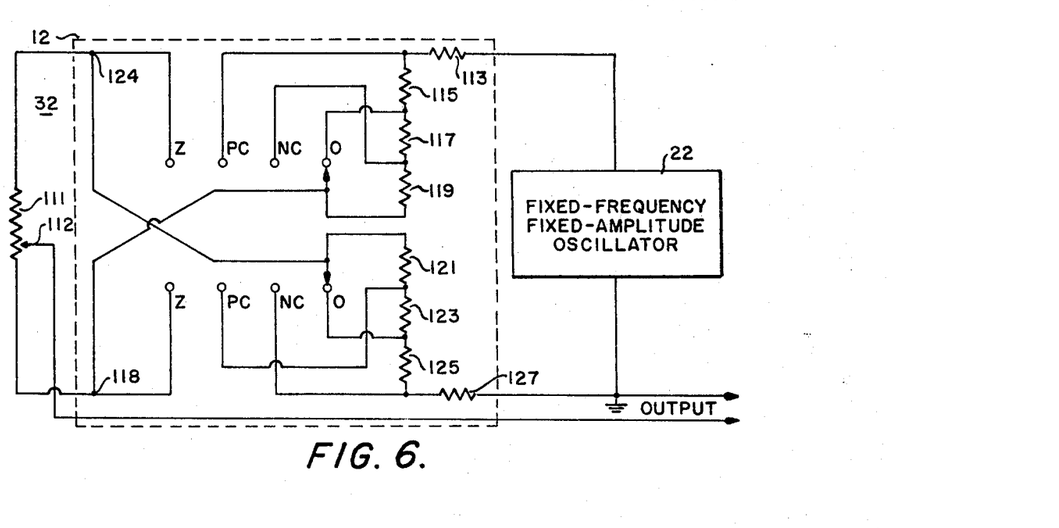
FIG. 6 illustrates the calibration network of a potentiometer type sensor utilized in the invention.

Referring to FIG. 6 we have a circuit diagram of the pitch angle transducer 32 and its associated calibrating network. The pitch angle transducer 32 utilizes a resistive sensor 111 having 2,000 ohms resistance from terminal to terminal. The calibration network 12 is provided with a first thousand ohm resistor 113 which is connected between the Positive Calibration sensing terminal, P.C. and the oscillator 22. A 500 ohm resistor 115 has one of its ends connected to the P.C. terminal and its other end connected to the operation terminal O. The 500 ohm resistor 117 has its first terminal connected to the operational terminal, O, and its other end connected to the negative calibration terminal N.C. A 500 ohm resistor 119 has one of its ends connected to the negative calibration terminal N.C. and its other end connected to the sliding contact 120. The sliding contact 120 is also connected to the junction point 118 of the sensor 111. A second sliding contact 122 has one end connected to the junction point 124 which is also connected to the sensor 111. The sliding contact 122 is connected to one end of a 500 ohm resistor 121. The other end of the 500 ohm resistor 121 is connected to the positive calibration terminal P.C. A 500 ohm resistor 123 has one of its ends connected to the positive calibration terminal, P.C., and its other end connected to the operation terminal, O. A 500 ohm resistor 125 has one of its ends connected to the operational terminal, O, and its other end connected to the negative calibration terminal, N.C. A 1,000 ohm resistor 127 has one of its ends connected to the negative calibration terminal, N.C., and its other end connected to ground. Assuming now, for the purpose of explaining the operation of the circuit diagram shown in FIG. 6, the arrangement of the pitch angle potentiometer and the position resistance referred to above of the calibration network is for the four switch positions Z, P.C., N.C., and O. A constant input voltage E, is provided by the oscillator 22 and the total resistance connected across the oscillator is 5,000 ohms in all switch positions. Assume that the potentiometer is physically located at any arbitrary point on the 2,000 ohm potentiometer. The resistance of that portion of the potentiometer between the lower network and the potentiometer arm is 2,000A, where zero is less than or equal to A which is less than or equal to 1. The output voltage $E_0$ for each switch position is as follows: In the position Z, the zero check position, it can be shown that the output voltage $E_{01}$ is one-half of the E, the output of the oscillator. In position P.C., the positive calibration position, the output voltage can be shown to be $E_{04}$ which is equal to $$\frac{2000 + 2000A}{5000} E$$

which equals $0.4(1+A) \times E$. In position N.C. the negative calibration position the output voltage $E_{03}$ can be shown to equal to $$\frac{1000 + 2000A}{5000} E$$

equals $0.2(1+2A)E$ and in the first operating position O the output voitage $E_{04}$ can be shown to be $$\frac{1500 + 2000A}{5000} E$$

equals $0.2(1.5+2A)E$. For these calculations, the parallel impedance of the external load is neglected since it is greater than one-hundred times the output resistance of the network under consideration. It can be shown that the pitch angle of interest or quantity which the transducer represents is equal to K (times the operating point O minus the zero checkpoint Z) over the positive calibration point value minus the negative calibration value $$K \frac{O - Z}{PC - NC}$$

Substituting the values for these symbols we get that the angle of interest is equal to $K$ times $(2A-1)$. K is the constant number of degrees determined during physical calibration and may be defined by the relationship of K equals F times the positive calibration reading minus F times the negative calibration, where F is the sensitivity factor for a given reading, and over a short period of time is considered to be constantly one for all practical purposes. This assumption is considered valid because the instruments do not drift or drift very little over a short period of time during which the tests are conducted The operation of FIG. 6 is as follows: The switches are successively rotated through their position Z, P.C., N.C. and position O. From the various readings taken one can thereby determine what the true pitch phase angle should be for the pitch angle transducer in this explanation. However, normally the calibration is set on O which is the operational point for reading the information or transmitting the information from the transducer 111. From the above calculations it can be ascertained that the pitch angle is independent of all the variations of the operated voltage and depends only on the value of the K and the position of the variable contact of the potentiometer, both of which may be readily ascertained or, alternatively, are known at all times. The only requirement is that the oscillator voltage remains at a relatively constant value during the calibration sequence and test run. These events normally occur over a relatively short period of time.

Figure 7:
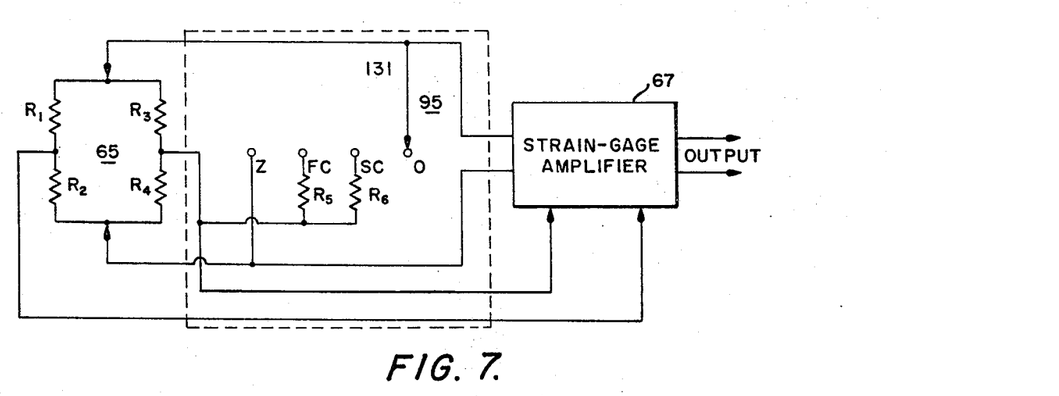
FIG. 7 illustrates the calibration network of a strain gage bridge utilized in the invention.

Referring now to FIG. 7 there is illustrated the strain gage bridge network which is utilized for the cable tension transducer 65. The bridge network contains a first resistance R1 connected in series with a second resistance R2. A third resistance R3 is connected in series with a fourth resistance R4. The two resistive arms containing R1, R2, R3 and R4 are connected in parallel. The output from the strain gage is taken between the junction of R1 and R2 and the junction of R3 and R4, and this output of the strain gage is connected to the strain gage amplifier 67. It is to be understood that the resistors R1, R2, R3 and R4 may be the common pressure responsive resistance which are well known and are for the purposes of illustrating the invention. Also the strain gage amplifier 67 provides the biasing current for the resistance strain gage 65 and feeds this bias current to the junction point of the bridge arm R1 and R3 and to the junction point to resistors R2 and R4. A zero position is provided having a terminal Z which is connected to the junction of the resistors R2 and R4 a second position FC for the first calibration step is provided which has a 50K ohm resistor R5 connected between the terminal FC and the junction of resistors R3 and R4. A 25K ohm resistor R6 is connected between the junction point SC, the second calibration step and the junction of the resistors R3 and R4. A fourth position O being the operation position is provided. In the case of FIG. 7, K, the constant, is equal to F, the sensitivity factor, times the second calibration step minus F times operation step. It is assumed that the sensitivity factor F remains relatively constant during the time of interest since a relatively short time is required to record a complete calibration test run sequence. Therefore F can be eliminated from the system and by equating it to 1 and SC minus O may be calculated. The difference between the voltage drops $E_{R_2} - E_{R_4}$ appearing across the resistors R2 and R4 represent the output in each switch position. In position Z, the zero check position, the output of the strain gage bridge is short circuited so that the output voltage $E_{Z_1}$ is zero. In position FC, the first calibration step, resistor R3 is shunted by resistor R5. Calibration in the first calibration step FC is used only as a check on the system linearity and its values are of no significance in the data reduction process. However for the sake of completeness the value $E_{O_2}$ is the indicated output voltage at this point in switch position FC, the first calibration step. In the second calibration step position the resistor R3 is shunted by the resistor R6. The equivalent resistances of the two resistors in parallel is termed Ry, wherein $e$=the oscillator voltage $$e_{R_4} = \frac{R_4 e}{Ry + R4}$$

$$e_{R_2} = \frac{R_2 e}{R1 + R2}$$

$$e_{O_3} = \left(\frac{R2}{R1+R2} + \frac{R4}{Ry+R4}\right) e$$

replacing all the resistors with the single equivalent resistor $$e_{D3} = R''e$$

In the position O, the operating position, there is no shunting resistor across $R_3$ and $$e_{R_4} = \frac{R_4 e}{R2 + R4}$$

$$e_{R_2} = \frac{R_2 e}{R1 + R2}$$

$$e_{O_4} = \left(\frac{R2}{R1+R2} - \frac{R4}{R3+R4}\right) e; \text{ or}$$

$$e_{O4} = R'''e$$

The general expression for the cable tension T is $$T = \frac{K(O-Z)}{FC-O}$$

Since the zero position, the second calibration step, and the operational point are all representative by output voltages in switch positions Z, S.C., and O the tension can be expressed by the formula $$T = \frac{KR'''e}{R''e - R'''e}$$

or $$T = K \frac{R'''}{R'' - R''}$$

The cable tension is independent of long termed variations in the transducer input voltage E and depends only on the value of K and the values of the resistors of the bridge arms. The above pressure force and angle measurements are independent of the long-term zero and sensitivity shifts F in the recording instruments. The only requirement of the system illustrated herein is that the calibration sequence and operating point remain within the limits of the recording equipment.

Figure 8:
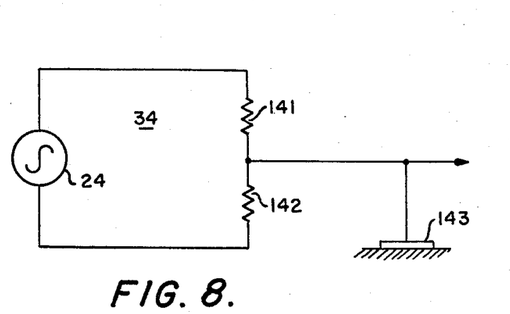
FIG. 8 illustrates the leak detector circuit utilized in the invention.

Referring to FIG. 8 there is illustrated a leak detector circuit which is utilized to form the detector 34. The oscillator 24 is connected to one end of a 2,500 ohm resistor 141. The other output of the oscillator is connected to one end of a 2,500 ohm resistor 143. Resistors 141 and 143 are connected to a common junction point which is ultimately connected to the mixer. A brass disc is cemented to the hull of the towed vehicle through an insulating adhesive so that the brass disc is normally insulated from the hull of the towed vehicle. However, if water should leak into the towed vehicle then the brass disc is shorted thereby eliminating the signal produced by the oscillator 24 which is normally fed to the mixer.

Figure 4A:
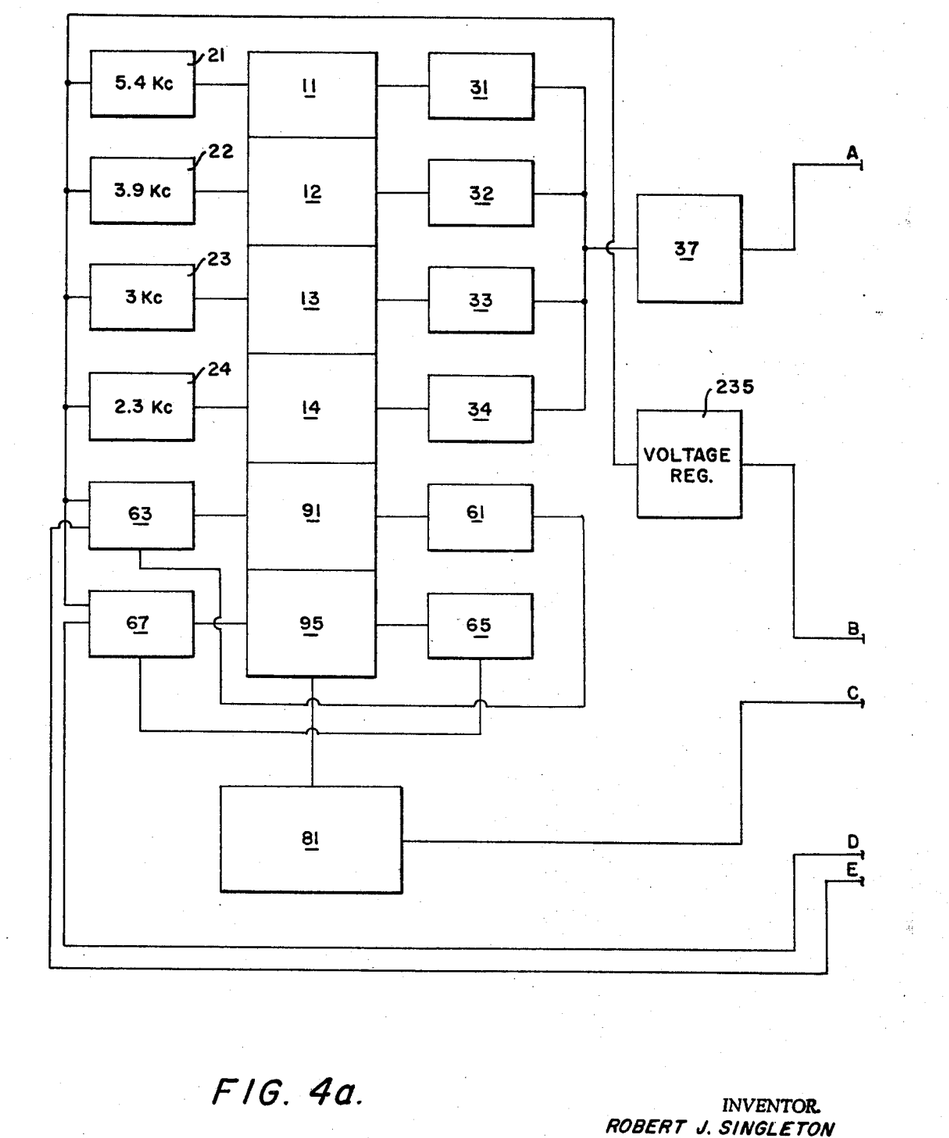
FIGS. 4a and 4b taken together make up a block diagram of the complete system of FIGS. 1, 2 and 3 as they are interconnected in accordance with the invention.
Figure 4B:
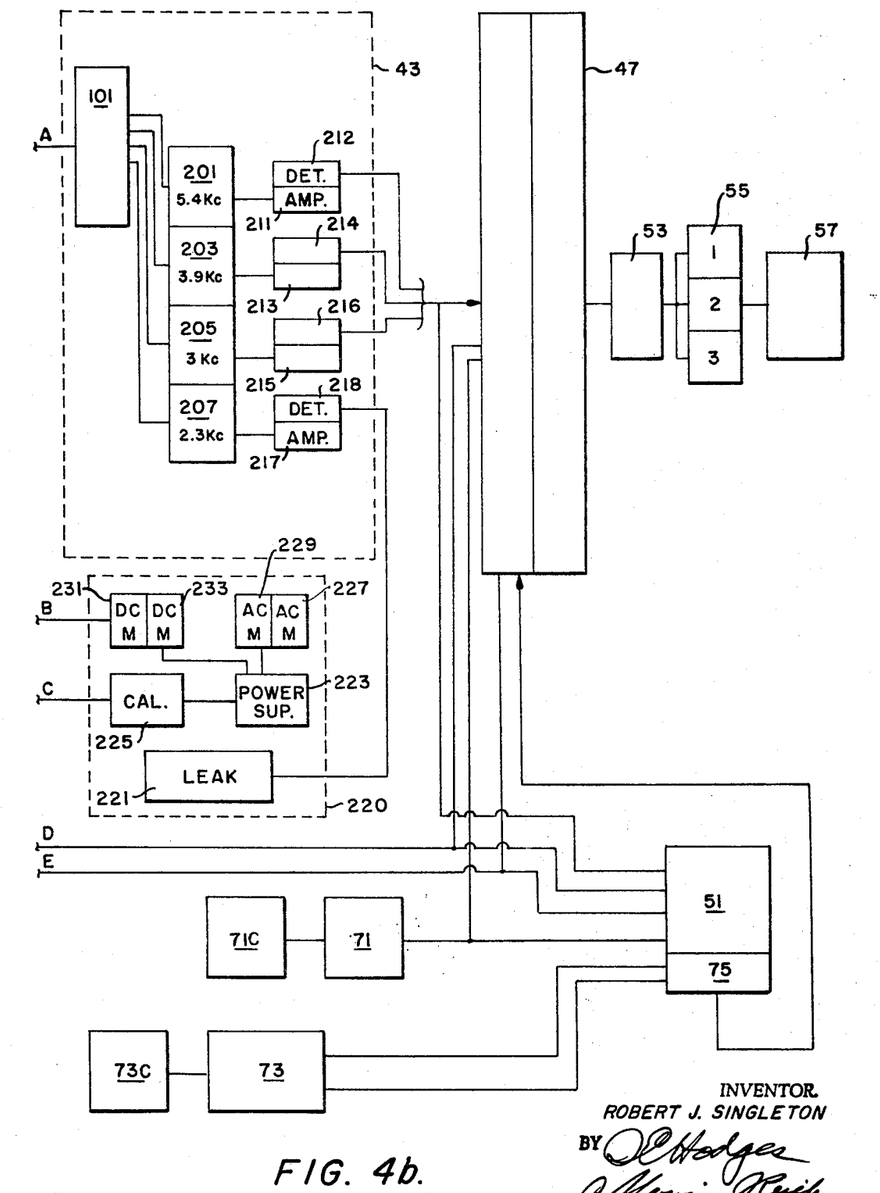

Referring to FIGS. 4a and 4b concurrently with the additional note that the blocks represented in FIG. 4a are carried by the towed body and the blocks illustrated in FIG. 4b are carried the towing vehicle. Additionally noting the common elements in FIGS. 1 thru 3 have the same numerical indicia and will not be described in further detail at this point since their operation is the same as heretofore depicted. However, the complete description of the operation of the blocks system will be given for FIGURES 4a and 4b.

Referring to FIG. 4b the impedance matching circuit band pass filters, amplifiers, and detectors 43 are illustrated as follows: a plurality of emitter followers are provided with each one feeding a separate band pass filter. The input for the emitter followers which are illustrated in detail in FIG. 5c is derived from the conductive line leading from the mixer 37. The first emitter follower output is connected to a band pass filter 201 which has a center band of 5.4 kilocycles matching the oscillator frequency of the oscillator 21. The output of the band pass filter 201 is amplified by an amplifier 211 and detected by a detector 212. The detector 212 feeds one channel of the multiple channel magnetic recorder. The same output is also fed over a line to the strip chart recorder 51 where the output of the detector 212 is recorded on a signal channel.

A second band pass filter 203 has its input connected to an emitter follower output and the band pass filter output is connected to an amplifier 213. The amplified output of the amplifier 213 is detected by the detector 214 and recorded by both the multiple channel magnetic tape recorder 47 and the strip chart recorder 51. Similarly a frequency band pass filter 205 has its input connected to an emitter follower output and the band pass output is connected to the amplifier 217. The amplifier 217 has its output connected to the detector 216. The output of the detector is connected to both the multi-channel magnetic tape recorder and also on the strip chart recorders. An output of an emitter follower circuit 101 is connected to band pass filter 207. The amplifier 217 has its input connected to the band pass filter 207 output. The amplifiers 217 output is connected to detector 218. The detector 218 has its output connected to the leak alarm 221. The electrical power for running the various pieces of electronic equipment is supplied by the towing vehicle to a power supply 223 which is provided with an AC volt meter 229 and a frequency meter 227 for monitoring the alternate current power being fed to the power supply 223. The power supply 223 rectifies the alternating current and provides a direct current output having one output lead connected to the calibration sequence start and hold switch control 225. A second DC power output is fed to a DC volt meter 233 and a DC ammeter 231 and then to the DC voltage regulator 235 which is in turn connected to the oscillators 21, 22, 23 and 24 and the amplifiers 63 and 67 in the towed body. The top tension transducer 73 which is surface mounted is provided with a calibrating network 73c which is similar to the calibrating network illustrated in FIGS. 6 and 7, however, the position control switch in the calibration network 73c is hand rotated. Similarly a cable angle transducer 71 is mounted on the surface towing vehicle and contains a calibration control network 71c which is adjusted by hand. The output of the cable angle transducer 71 is fed to the strip chart recorder and to the magnetic tape recorder.

The output of the top tension cable sensor 73 is fed to the amplifier 75 which inturn feeds an output to the strip chart recorder 51 for recordation on a channel and another output to the multi-channel magnetic tape recorder 47. It is to be understood that the recorders utilized have sufficient recording channels for the system, however, if it is found that there are not sufficient channels in a single recorder, then two or more recorders may be utilized within the scope of the invention.

The operation of FIGS. 4a and 4b are as follows: The role angle is sensed by the role angle sensor 31, the pitch angle is sensed by the pitch angle sensor 32, the cable angle is sensed by the cable angle sensor 33, the leak detector 34 detects leaks, the body depth detector 61 detects the depth at which the towed body is riding and the towed body cable tension detector detects the tension of the cable at the towed body. These various transducers receive their respective signals, in the case of the role angle transducer 31 from the oscillator 21 which is a 5.4 kc. oscillator through the calibrating network 11 as illustrated in FIGS. 6 and 7 to the mixer 37. Similarly the oscillator 22 drives the pitch angle transducer sensor 32 through the calibrating network 12. Similarly the cable angle transducer 33 is driven by the oscillator 23 and the leak detector 34 is driven by the oscillator 24 through the calibrating network 14. The output of the various transducers 31 thru 34 are fed to the mixer where the outputs are combined and transmitted to the towing vessel through the cable provided for the towing of the towed body. The cable from the mixer 37 feeds the emitter follower circuits 101. The emitter follower circuits are an impedance matching network which matches the individual band pass filters to the mixer 37. The band pass filters for instance are chosen that the band pass filter 201 will pass the information transmitted from the roll angle transducer 31, the band pass filter 203, the information transmitted by the pitch angle transducer 32, the band pass filter 205, the information transmitted by the cable angle transducer 33, and the band pass filter 207 will pass the information from the leak detector 34. This information is then amplified and detected by their respective amplifiers and detectors and recorder on respective channels of the multi-channel magnetic tape recorder 47 and strip chart recorders 51. Aboard the towing vehicle the multi-channel magnetic tape recorder is provided with an output for feeding the digital format control 53 which contains an analog to digital converter for converting the analog signals from the multi-channel tape recorder to digital information. The analog to digital converter is able to accommodate all the analog channels that are present in the magnetic tape recording system. The output depending on the time period of the count 1 second, 10 seconds, or 100 seconds is fed by a switching network to the counters 1 or 2 or 3 respectively. The output of the digital format control 53 is fed to the switching network counters 1 or 2 or 3 depending on a time interval over which it is desired to have the count taken. For instance the count interval of the first counter will be one second the count interval on the second counter will be 10 seconds and the count interval on the third counter will be a 100 seconds. This change in time can be adjusted by a manual control which is provided in the switch network control and may be changed from time to time as desired by the operator who is on the towing vehicle. The setting of the switch network controlling the time automatically sets the column selector so that the paper tape printer 57 prints out in the respective one second channel, 10 second channel, or 100 second channel as manually chosen by the operator. The cable angle transducer 71 is provided with a cable angle calibrating circuit 71c which is manually operated and the top tension sensor 73 is provided with a top sensor calibration network 73c which is also manually operated. The circuits of the calibrating network 71 and 73 are similar to the circuits of FIGS. 6 and 7 except that the switching is manually operated instead of being accomplished by the actuation of a solenoid switch. The output of the top tension transducer is fed through an amplifier 75 which in turn feeds one channel of the strip chart recorder 51 and one channel of the multi-channel tape recorder. The regulator 235 is utilized for feeding the oscillators 21, 22, 23 and 24 and additionally it feeds the amplifiers 63 and 67 with B+ voltage.

Figure 5A:
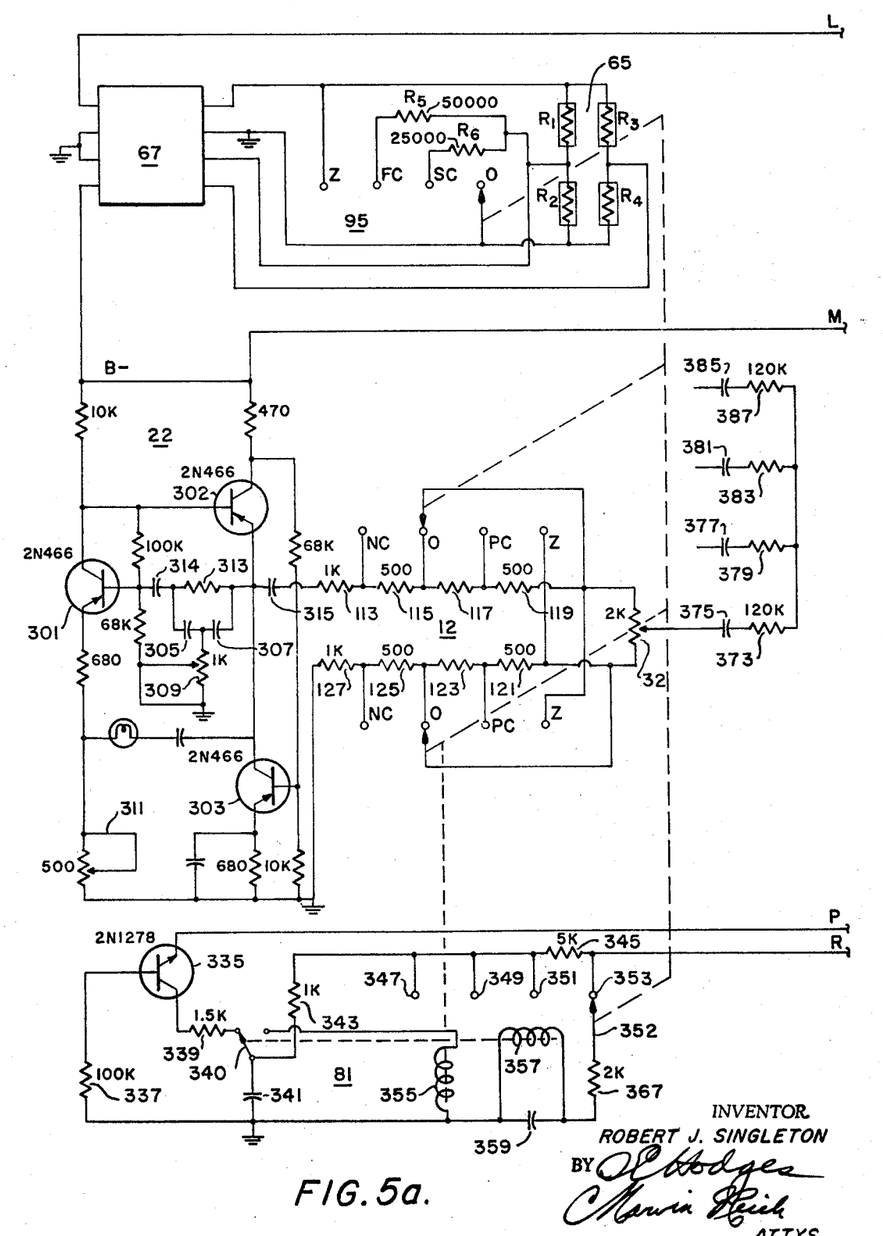
FIGS. 5a, 5b, and 5c taken together illustrated the circuit diagram utilized in the block diagram of FIGS. 4a and 4b in accordance with the invention.
Figure 5B:
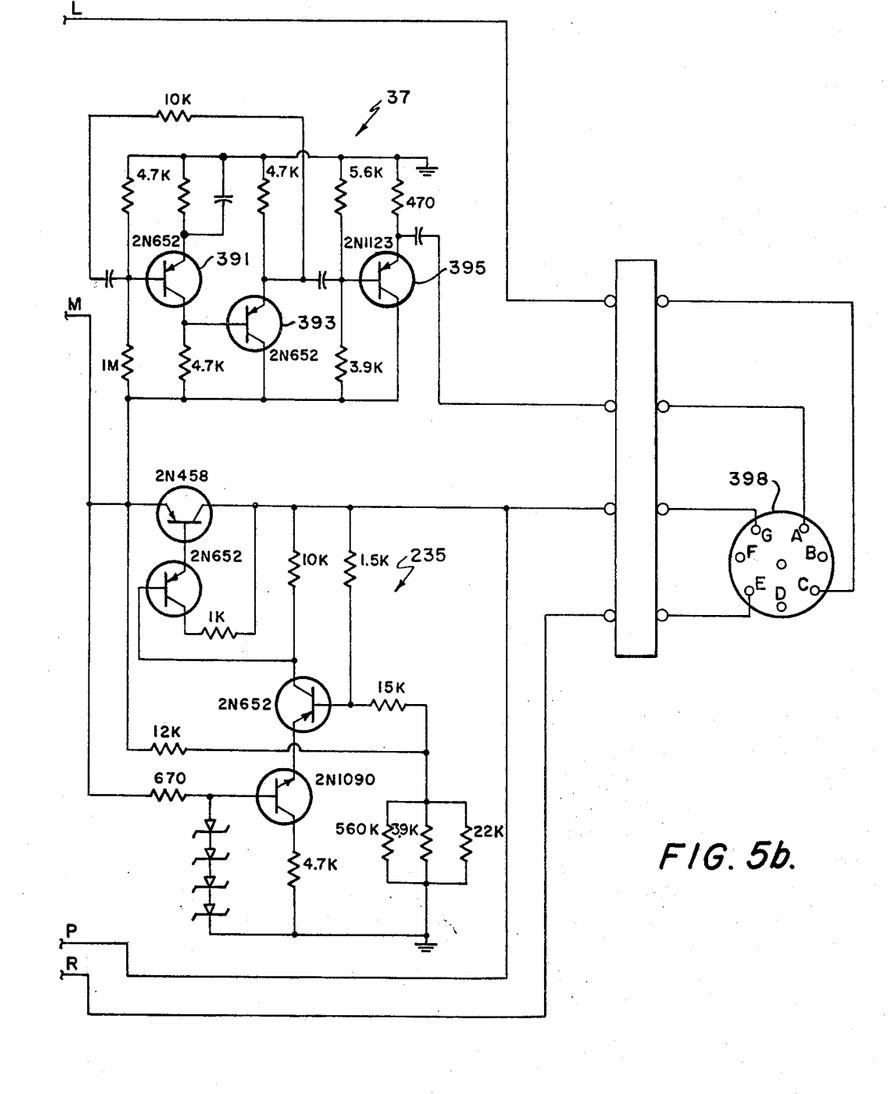
Figure 5C:
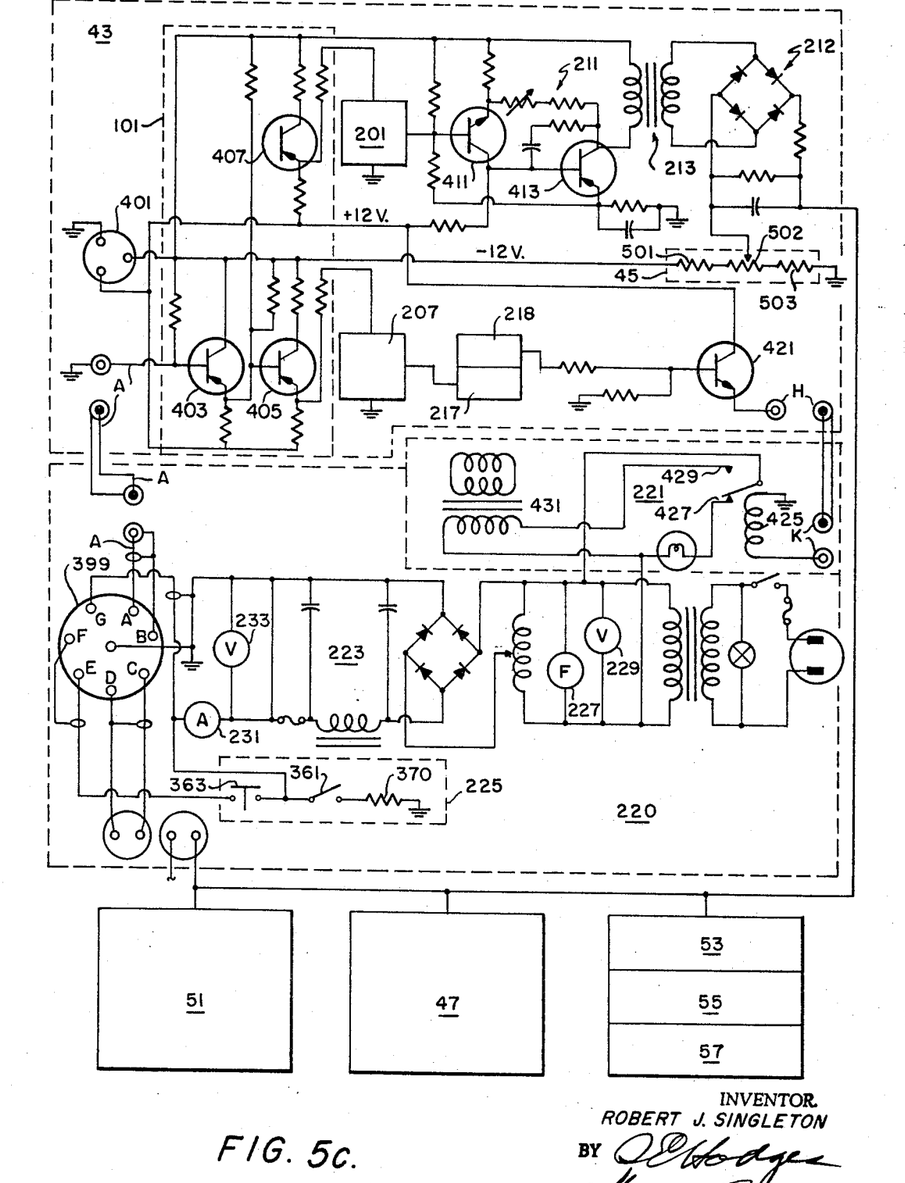

Referring simultaneously to FIGS. 5a, 5b and 5c, which contained the circuits for the block diagram illustrated in the embodiments of 4a and 4b, there is shown a suitable oscillator 22 contains a first transistor 301 cross coupled to a second transistor 302 so that the collector of transistor 301 is directly connected to the base of transistor 302. A third transistor 303 is provided. The transistor 301, 302 and 303 are shown as being the PNP conductivity type. The collector of transistor 303 is directly connected to the emitter of transistor 302. The junction of the emitter of transistor 302 and collector of transistor 303 is connected through a resistor 313 and capacitor 314 to the base of the transistor 301. A first and second capacitor 305 and 307 are connected in parallel with the resistor 313. The junction of the capacitor 305 and 307 has a variable resistor 309 connected thereto. The other end of the variable resistor 309 is connected to ground. The frequency of oscillations of the oscillator is determined by the values of the resistors 309 and 313 and the capacitors 305, 307. The frequency may be adjusted by adjusting the variable resistance of the variable resistor 309. A variable resistor 311 is provided for adjusting the amplitude of the oscillator output. The calibrating network has its first resistor 113 connected to a capacitor 315 which is in turn connected to the collector of the transistor 303. It is to be noted that the oscillations produced by this oscillator when it oscillates are transmitted through the calibration network 12 to the transducer 32.

The stepping switch 81 as illustrated in FIG. 5a contains a transistor 335 which is connected through a resistance 339 to a first end of capacitor 341 which is connected to a rotating switch 340. The other end of the capacitor 341 is connected to ground. The transistor 335 is provided with a bias resistor 337 which is directly connected to the base of transistor 335. The other end of the biasing resistance 337 is directly connected to the ground. The emitter electrode of the transistor 335 is connected to the output of the negative power supply which has a negative DC voltage of minus 40 to 50 volts which is derived from the power supply 223. The switching unit has a rotating solenoid 355 and an actuating relay 357. A switch 340 is provided for switching the condenser 341 from the collector resistance 339 of the transistor 335 to the rotating solenoid 335 upon the actuation of the stepping switch 363 which will be described hereafter. The resistor 343 has one end connected to the terminals 347, 349 and 351 of the stepping mechanism and its other end to the rotating switch 340 in parallel with the capacitor 341. A resistance 345 is connected between the series of terminals 347, 349, 351 and the operating position of the terminal 353. The terminal 353 is the operation position O of the indicated calibration network heretofore described in combination with the other figures. A resistor 367 is connected between the stepping switch 352 and the condenser 359 in series with ground. The condenser 359 has a relay coil 357 connected in parallel therewith. It is to be noted that when the switch 363 is closed which is illustrated in FIG. 5c as part of the stepping mechanism 221.

The operation of the stepping switch is as follows: A negative pulse is transmitted down the line due to the switch 363 connecting the relay winding 357 to the negative output terminal of the power supply 223. The switch 361 is provided to stop the operation of the rotary switch 81 by grounding out the stepping switch if desired. The negative pulse activates the relay switch winding 357 switching the contact 352 from the terminal 353 to 351. The switch 340 is removed from the resistor 339 and is connected across the rotating solenoid winding 355. This relay switch winding holds the relay closed for the period of time that it takes the capacitor 341 to substantially discharge through the solenoid winding 355. The switch 340 is then permitted to disengage and resumes contact with the resistor 339 whereby causing the capacitor 341 to charge through the transistor 335. Upon reaching its fully charged state the capacitor 341 becomes a high impedance permitting the capacitor 359 to charge through the transistor 335 and also to fire the relay winding coil. The charged capacitor is connected to the rotating solenoid winding 355 causing the rotating arm to move from terminal 351 to terminal 349. The process continues until the contact terminal 352 is returned to contact 353. When the contact 352 is returned to the position 353 the current continues to flow through the winding 357 thereby holding the contact of the switch 340 against the terminal connected to the solenoid winding 355. To start the rotating cycle the switch 363 must be opened and then closed again. The output of transducer 32 is coupled through a capacitor 375 and a resistor 373 to the input of the transistor 391 of the mixer 37. Similarly the other transducers are coupled through respective one of the following capacitor-resistor combination, capacitor 377 resistor 339 combination, the capacitor 381 and the resistor 383 combination, and the capacitor 385 and the resistor 387 combination. It is to be noted due to the fact that there are multiple channels and that it will take an unduly large specification to describe all of the components used in each channel only one complete circuit for one channel is illustrated with the understanding that the other channels use the identical components. All the signals transmitted from all the transducers are then presented to the base of the transistor 391 which mixes and amplifies them. The mixed and amplified signal is further amplified in the emitter follower transistor 393 whose output is coupled to the base of emitter follower 395 which sends the signals up the cable.

FIG. 5b which contains both the mixer 37 and the voltage regulator 235. The voltage regulator 235 is a commonly available voltage regulator and is illustrated by way of example however the details of the various transistors will not be described. The circuits illustrated on the sheet 5b are connected to the circuits illustrated on the sheet 5c through the connecting connector 398 and 399 which interconnect into one another. The other connectors where they interconnect between the units are shown as connectors and the commonly label connectors are connected together. The lead A which is connected to the output of the mixer 37 is connected to the connector A of 398 and 399. The pin a of the connectors 399 is connected to the base of an emitter follower transistor 403. The emitter output of the emitter follower 403 is connected to the base of the respective emitter follower transistors 405 and 407. The connections are similar for the unillustrated emitter followers for the other channels not here illustrated. The emitter followers 403, 405 and 407 are the matching networks of the box 101. The output of the emitter follower 407 is connected to a band pass filter 201. The band pass filter 201 has a 5.4 kc. center frequency and the only frequency passed by this filter is the band around 5.4 kc. The output of the band pass filter is fed to the amplifier 211 which contains amplifying transistors 411 and 413. The output of the amplifier 211 is taken across the output transformer 413. The adjustable biasing network shown on FIG. 1 of the disclosure is the adjustable DC biasing networks 45 having a first resistor 503 with one of its ends connected to ground and its other end connected to a potentiometer 502. The other end of the potentiometer 502 is connected to a third resistor 501 which is in turn connected to a −12 volt voltage source. Therefore the level of the signal which is then fed from the detector 212 to the various recorders 51, 47 and to the analog digital converter can be adjusted. However, once this adjustment is made it is constant for the entire series of the measurements upon one running of the towed body. The leak detector alarm 221 and associated detector network is connected to the emitter followers 403 and 405 of the matching network 101 through a first band pass filter 207. The output of the band pass filter 207 is fed through the amplifier 217 and the detector 218 to an emitter follower driving transistor 421. The output of the emitter driver transistors 421 is utilized for operating the relay 425. When the oscillator 24 shown in FIG. 4a is oscillating and the detector 34 shown in FIG. 4a has not been shorted to the casing of the towed body then a 2.3 kc. signal is transmitted up through the mixer and up through the line which is then coupled to the 2.3 kc. band pass filter 207. This signal is then amplified by the amplifier 217 detected by the detector 218 which causes the emitter follower transistor 421 to become conductive. The conduction of the emitter follower transistor 421 causes the relay contact 427 to be closed thereby lighting the light to indicate that there is no leak in the leak detector. However, when a leak occurs in the towed body then the oscillator is shorted in the towed body thereby sharply reducing the signal available to be transmitted up to the telemetering section. When this happens there is an insufficient signal available to be amplified by the amplifier 217 and detected by the detector 218 to cause the transistor 421 to be conductive. When the transistor 421 is nonconductive the relay 425 is not energized and the relay contact is on terminal 429 which causes the buzzer 431 to ring thereby warning the operator that there is water being taken aboard the towed vehicle.

The operation of FIGS. 4a, 4b, 5a, 5b and 5c will be taken concurrently. It is to be noted that the various oscillators and driving circuits are turned on the towing vehicle by turning on the power supply 223 aboard the towing vehicle. When the power supply is turned on it rectifies an output voltage of 40 to 50 volts DC which is then regulated by the voltage regulator 235. The output of the regulated voltage is then sent to the various amplifiers and oscillators aboard the towed body. The electrical signals generated by the oscillators are an AC signal which is varied according to the effects of the transducers monitoring the performance of the towed body. For instance the signal in the transducer 31 is monitored according to the role angle of the vehicle. The signal on the pitch angle transducers is modified according to the pitch of the vehicle. The signal on the cable angle transducer is modified according to the angle of the cable of the transducer and a signal generated in the leak detector 34 is modified according to whether there is water in the towed vehicle or not. Similarly the DC sensors of cable tension and body depth are modified the DC voltage supplied to them according to the tension on the cable and also according to the depth of the vehicle. The information contained or sensed by the various transducers are then mixed in the mixer 37 and amplified by the various mixer transistors 391, 393 and coupled up the cable by the emitter follower mixer transistor 395. Simultaneously the body depth transducer is coupled through an amplifier 63 which amplifies the signal and the cable tension transducer is coupled through amplifier 67 to separate wires in the cable up to the towing vehicle. The amplified signal coming from the amplifier 63 and 67 are recorded directly on two of the channels of the magnetic tape recorder 47 and the ship chart recorder 51. The signals which come from the mixer are then taken off the A lead as illustrated in FIG. 5c and fed to the emitter follower impedance matching networks 101. The signal is then broken up into its various pass bands by the respective pass band filters 201 and 207. The respective signals are then amplified and detected which is the case of all the signals except the leak detector. The detected signals are fed to the recording instrumentation package and the data processing package provided on the towing vehicle. However, in the case of the leak detector the detected signal is then used to drive a transistor 421 for operating the warning buzzer 431 to indicate when the towed vehicle is taking on water.

Obviously many modifications and variations of the present invention are possible in the light of the above teachings.

What is claimed is:

1. In a system for transmitting information from a towed body to a towing vehicle comprising:
    a towed body;
    a towing vehicle;
    a plurality of transducer means mounted on said towed body or sensing a plurality of physical phenomena;
    a plurality of calibrating circuits mounted on said towed body;
    means mounted on said towed body for driving said transducers, said means for driving being connected through said calibration circuit to said transducer;
    means for simultaneously transmitting the outputs of said plurality of transducers and said calibration circuits to said towing vehicle; and
    data processing means mounted on said towing vehicle and connected to said means for transmitting for processing the data generated by said transducers.

2. A system as claimed in claim 1 in which one of said transducers is a leak detector comprising a conductive plate mounted in said towed body;
    a thin layer of insulation mounted to insulate said plate from ground;
    a circuit connecting said plate to said means for simultaneously transmitting the outputs to the towing vehicle;
    a constant amplitude, fixed frequency oscillator having an output circuit one side of which is grounded;
    said plate being connected in parallel with the output circuit of said oscillator, whereby a leak in said towed body will cause a short across said plate to ground and thereby shorting said oscillator output to cause a drop in the amplitude of the outputs transmitted to said towing vehicle; and
    means on said towing vehicle connected to respond to the drop in the amplitude of said outputs to indicate the presence of a leak in said towed body.

3. In a system for transmitting information as claimed in claim 1 in which each of said calibrating circuits comprises:
    a plurality of resistors connected to be selectively inserted in the circuit between said driving means and said transducer;
    means operatively connected to select the resistor of said plurality of resistors to be connected in the circuit.

4. A system as claimed in claim 1 in which each of said driving means is an oscillator and in which each of said calibration circuits includes a plurality of resistors connected as voltage dividers between said oscillator and said transducer.

5. In a system as described in claim 1 wherein said means for simultaneously transmitting the output of said plurality of transducers includes a mixer means mounted in the towed body for combining the information produced by a plurality of said transducers into a single channel and means mounted on said towing vehicle for separating the received information into its original number of channels.

6. In a system as described in claim 5 wherein said means for separating the information into separate channels comprises an impedance matching emitter follower stage having an input and a plurality of outputs, said input being connected to said mixer;
    a plurality of band pass filters having an input and an output, said respective inputs of said plurality of band pass filters being connected to a respective output of said impedance matching emitter follower stage;
    a plurality of amplifiers, each amplifier having an input and an output, said amplifier inputs being connected to said respective output of said band pass filters;
    a plurality of detectors, each having an input and an output, each of said detector inputs being connected to a respective amplifier output, said output of said detectors being connected to said data processing means whereby said information is processed and recorded.

7. In a system as described in claim 2 wherein a mixer means is provided in the towed body for combining the information produced by a plurality of said transducers into a single channel and means mounted on said towing vehicle for separating the received information into its original number of channels.

References Cited

UNITED STATES PATENTS

| | | | |
|---|---|---|---|
| 2,863,619 | 12/1958 | Servanty | 343—225 XR |
| 2,992,417 | 7/1961 | Hoefs et al. | 340—187 XR |
| 3,317,672 | 5/1967 | Cestaro | 340—150 XR |
| 3,357,007 | 12/1967 | Wike et al. | 340—183 |

OTHER REFERENCES

"Telemetry Over Telephone Lines," British Communications and Electronics, January 1963, pages 42–47.

DONALD J. YUSKO, Primary Examiner